United States Patent Office 3,027,348
Patented Mar. 27, 1962

3,027,348
STABILIZATION OF SYNTHETIC RUBBERS
William P. Boyer, Richmond, Va., Jesse Roger Mangham, Baton Rouge, La., and Thomas Mason Melton, Richmond, Va., assignors to Virginia-Carolina Chemical Corporation, Richmond, Va., a corporation of Virginia
No Drawing. Original application Apr. 23, 1956, Ser. No. 579,777. Divided and this application Aug. 14, 1958, Ser. No. 758,641
9 Claims. (Cl. 260—45.7)

This invention relates to new mixed aliphatic mononuclear aryl, i.e. alkyl mononuclear aryl and alkenyl mononuclear aryl esters of phosphorous acid derived from monohydric saturated and unsaturated alcohols and monohydric mononuclear phenols.

The invention relates further to a process for the production of the above mentioned esters of phosphorous acid and esters derived from di and polyhydroxy alcohols such as ethylene glycol, glycerol, propylene glycol, pentaerythritol and trimethylene glycol. The alcohols may be primary or secondary alcohols and the hydrocarbon groups thereof may be straight chain or branched and saturated or unsaturated and one or more hydrogens thereof may be substituted by inactive substituents such as halogen.

More particularly the invention relates to phosphite esters of the general formula

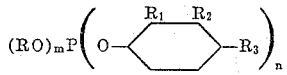

in which $m$ and $n$ are integers and the sum thereof is 3, R is an aliphatic, i.e. alkyl or alkenyl radical of the group consisting of allyl, 3-cyclohexen-1-ylmethyl, 2-ethylhexyl, n-octyl, isooctyl, nonyl, decyl, dodecyl, oleyl and octadecyl, R and $R_2$ are members of the group consisting of hydrogen and methyl and $R_3$ is a member the group consisting of hydrogen, methyl, nonyl, octyl [1], isopropyl and tert-butyl and in which not more than one of $R_1$, $R_2$ and $R_3$ is an aliphatic group.

The invention relates further to stabilized mixtures of vinyl resins and synthetic rubbers with phosphite esters of the above general formula.

The alkyl and alkenyl aryl esters of this invention are generally nearly colorless liquids having mild characteristic odors. These new esters have utility in stabilizing vinyl resins toward thermal discoloration. To this application they are well suited with regard to compatibility with the resin, odor, etc.

They are efficaceous also for the stabilization of GR–S synthetic rubber toward thermal discoloration. In fact, they are unique in that they are the only stabilizers known to us which cause a "bleaching out" of the color originally present in the GR–S stock. In addition they prevent surface crust formation caused by decomposition during heating. In this application they are well suited with regard to compatibility with the synthetic rubber stock, odor, etc.

The compounds or compositions of this invention may be pure monoalkyl or monoalkenyl diaryl phosphites, pure dialkyl or dialkenyl monoaryl phosphites or mixtures thereof along with a small amount of trialkyl and/or trialkenyl and/or triaryl phosphites. The amounts of the trialkyl, trialkenyl and triaryl phosphites present have not been determined but never have been found to be sufficient to require purification for their removal. The tri compounds are not harmful excepting in so far as they act as diluents or inert material. These compositions may be prepared from relatively pure diaryl phosphorochloridites, relatively pure monoaryl phosphorodichloridites or mixtures thereof along with small amounts of phosphorus trichloride and/or triaryl phosphites.

In the new process of our invention the requisite mono- or diaryl phosphorohalidite, usually the phosphorochloridite, is caused to react with the calculated equivalent or an excess of an aliphatic alcohol with the simultaneous admission of anhydrous ammonia so that the reaction mixture is maintained substantially neutral.

The preparation of the mixed aliphatic aryl phosphites from the aryl phosphorochloridites and alcohols may be shown by the following equations:

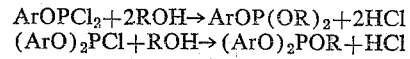

If these reactions are carried out without removal of the hydrogen chloride as it is formed, the mixed triester products are immediately decomposed to the corresponding acid phosphites. (Milobendzki and Szulgin Chemik Polski 15, 66–75 (1917). The following equations illustrate this:

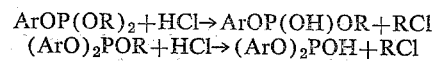

In the past, in processes of making other phosphite esters, this side reaction has been prevented either by the use of a tertiary amine (usually pyridine) to remove the hydrogen chloride as it is formed by formation of the insoluble pyridine hydrochloride (Milobendzki and Szulgin Chemik Polski, 15, 66–75 (1917) (CA 13: 2867 (1919)) or by the use of sodium alkoxide in the original reaction (Arbuzov and Valitova, Izvestiya Akad. Nauk S.S.S.R., o.k.h.n., 1940, 529 (CA 35: 3990 (1941)) and Arbuzov and Valitova, Trudy Kazan Khim Tekhnol. Inst., 8, 12 (1940) (CA 35: 2485 (1941)).

Neither of these methods of neutralization is economical for commercial operations in making the compounds of our invention. In the tertiary amine method (which uses an inert solvent) the procedure is quite expensive and any commercial adaptation necessitates the tedious and costly recovery, purification and reuse of the organic base. With sodium alkoxides the yields are low and the desired mixed tertiary ester is contaminated with considerable amounts of undesired by-products.

Because of these drawbacks to the known preparative methods which start with phosphorochloridites, an alternative synthetic approach has been used in the past for laboratory operations. This laboratory method employs triaryl phosphite and this starting material is forced to undergo ester interchange with an alcohol or an alkoxide. With alcohols the method is limited by the lack of reactivity of most alcohols at reasonable temperatures and by a tendency toward isomerization to the corresponding phosphonate at the elevated temperatures required to obtain a reasonable reaction rate (Milobendzki and Szulgin, Chemik Polski, 15, 66–75 (1917) (CA 13: 2867 (1919)).

Ester interchange occurs readily when an excess of an alkali metal alkoxide is heated with a triaryl phosphite. The commercial utility of this synthetic method is limited since the yields are lower than those using aryl phosphorochloridites with alcohols and tertiary amines and the danger of handling metallic alkoxides is an obvious drawback.

The aryl phosphorochloridites, which are the raw materials for our new process, may be prepared conveniently by either of two methods. One method involves heating together suitable portions of a triaryl phosphite and phosphorus trichloride which permits the following reversible reaction to take place. [Conant, ---
[1] Unless noted otherwise, the term octyl signifies p-1,1,3,3-tetramethylbutylphenyl. 92–95% is the para-isomer; the balance is the ortho-isomer. See Rohm and Haas Bulletin SP-98, June 1954, page 1.

Wallingford and Grandheker, J. Am. Chem. Soc., 45, 762 (1923)].

$$(ArO)_3P + PCl_3 \rightleftharpoons (ArO)_2PCl + ArOPCl_2$$

In this equation Ar stands for a broad variety of aryl radicals including any one of the substituted aryl groups described above. The position of the equilibrium varies with the relative proportions of the reagents used according to the law of mass action.

A second method which may be employed requires warming together suitable portions of the requisite phenol and phosphorus trichloride whereupon reaction takes place as follows. [Menshutkin, Ann., 139, 343 (1866)]:

$$6ArOH + 3PCl_3 \rightarrow ArOPCl_2 + (ArO)_2PCl + (ArO)_3P + 6HCl$$

In this equation Ar has the same meaning as in the foregoing paragraph. This reaction is not an equilibrium type but the relative proportions of the three aromatic-containing products and of unreacted phosphorus trichloride vary with the relative proportions of the reagents used. Generally speaking the higher is the phenol ratio the greater are the amounts formed of diaryl phosphorochloridite and triaryl phosphite. Conversely, the higher is the ratio of phosphorus trichloride the greater are the amounts of monoaryl phosphorodichloridite and unreacted phosphorus trichloride remaining at the end of the reaction period.

The general experimental write-up below shows one procedure used in the preparation of the mono and diaryl phosphorochloridites.

METHOD A $$(ArO)_3P + PCl_3 \rightleftharpoons (ArO)_2PCl + ArOPCl_2$$

Phosphorus trichloride and the appropriate triaryl phosphite, in the ratio of 1.5 moles to 1.0 mole respectively, were placed in the reaction vessel equipped with a sealed stirrer, a reflux condenser and a thermometer. The mixture was heated at reflux for a period ranging from 4.5 to 5.5 hours. The temperature was allowed to increase to a maximum of 140° C. The resulting mixture was fractionally distilled to obtain the desired pure mono and diaryl phosphorochloridites. Distillation was not necessary in the preparation of technical mixtures of dialkyl monoaryl phosphites with monoalkyl diaryl phosphites. The following experimental examples show specifically the preparation of the aryl phosphorochloridites by Method A.

Example I

DIPHENYL PHOSPHOROCHLORIDITE AND PHENYL PHOSPHORODICHLORIDITE

One hundred twenty-four grams of phosphorus trichloride and 186 g. of triphenyl phosphite were mixed and heated at reflux for a total of 5½ hours, during which time the reflux temperature increased from 85° C. to 140° C. Fractional distillation of the resulting mixture gave 66 g. of diphenyl phosphorochloridite, $n_D^{25.7°\ C.}$ 1.5760, $d_4^{26}$ 1.242, B.P. 110–113° C./0.4 mm. and 84.5 g. of phenylphosphorodichloridite, $n_D^{26°\ C.}$ 1.5380, $d_4^{27}$ 1.353, B.P. 86–90° C./10 mm., as well as other mixed fractions which contained in addition to the two above compounds, some unreacted phosphorus trichloride and triphenyl phosphite.

Example II

DI-p-TOLYL PHOSPHOROCHLORIDITE AND p-TOLYL PHOSPHORODICHLORIDITE

One hundred twenty-four grams of phosphorus trichloride and 214 g. of tri-p-tolyl phosphite were mixed and heated at reflux for a period of 4½ hours, during which time the reflux temperature increased from 80° C. to 110° C. Fractional distillation of the resulting mixture gave 50.8 g. of di-p-tolyl phosphorochloridite, $n_D^{30°\ C.}$ 1.5624, $d_4^{20}$ 1.188, B.P. 138–140° C./0.08 mm.

*Anal.*—Calc'd: P, 11.03; Cl, 12.64. Found: P, 10.98; Cl, 12.83.

There was also obtained 26.8 g. of p-tolyl phosphorodichloridite, $n_D^{30°\ C.}$ 1.5478, $d_4^{20}$ 1.304, B.P. 103–106° C./10 mm.

*Anal.*—Calc'd: P, 14.81; Cl, 33.96. Found: P, 15.72, 15.78; Cl, 33.98.

Other fractions were also obtained which contained, in addition to small amounts of the above compounds, some unreacted phosphorus trichloride, and tri-p-tolyl phosphite.

The general experimental write-up below shows the second procedure used in the preparation of the mono and diaryl phosphorochloridites.

METHOD B $$6ArOH + 3PCl_3 \rightarrow ArOPCl_2 + (ArO)_2PCl + (ArO)_3P + 6HCl$$

Phosphorus trichloride and the appropriate phenol, in the molar ratio of 1 to 1 or 1 to 2, were mixed in the reaction vessel equipped with a sealed stirrer, a dropping funnel (or solid addition tube), a thermometer and a reflux condenser. The condenser was connected to an aspirator through a Dry Ice trap in order to remove phosphorus trichloride that might be entrained during hydrogen chloride evolution.

The phenol and phosphorus trichloride were either mixed in the vessel initially, or mixing was accomplished by slowly adding the phenol, as a solid or liquid, or a a solution in an inert solvent, to the stirred phosphorus trichloride. Addition time varied from about 0.5 to about 6.7 hours. A slight negative pressure (approx. 1 atm.—5 mm.) sometimes was maintained during this period to facilitate removal of the hydrogen chloride gas, and when sufficient phosphorus trichloride accumulated in the Dry Ice trap, it was returned to the reaction vessel.

After the phenol addition was completed, the pressure was decreased to a minimum of about 1 mm. and the temperature was increased to a maximum of about 95° C. Total reaction time varied from about 1.67 to about 6.7 hours. The resulting mixture was fractionally distilled to obtain the desired pure mono and diaryl phosphorochloridites. Distillation was not necessary in the preparation of technical mixtures of dialkyl monoaryl phosphites with monoalkyl diaryl phosphites.

The following experimental examples show specifically the preparation of the aryl phosphorochloridites by Method B.

Example III

DI-o-TOLYL PHOSPHOROCHLORIDITE AND o-TOLYL PHOSPHORODICHLORIDITE

A mixture of 216.6 g. of o-cresol, and 137.4 g. of phosphorus trichloride was heated gradually from 25° C. to 60° C. over a period of 4½ hours. During the last hour of heating, reduced pressure was gradually applied to aid in removal of the hydrogen chloride, so that at the end of the reaction, 94% of the theoretical amount of the hydrogen chloride had been removed, and a pressure of 100 mm. had been obtained. By fractional distillation of this mixture, there was obtained 22.0 g. of o-tolyl phosphorodichloridite, $n_D^{30°\ C.}$ 1.5514, $d_4^{20}$ 1.306, B.P. 98–101° C./11 mm.

*Anal.*—Calc'd: P, 14.85; Cl, 33.96. Found: P, 14.83; Cl, 33.94.

There was also obtained 122.5 g. of di-o-tolyl phosphorochloridite $n_D^{30.5°\ C.}$ 1.5666, $d_4^{20}$ 1.193, B.P. 135–139° C./0.05 mm.

*Anal.*—Calc'd: P, 11.03; Cl, 12.63. Found: P, 10.97; Cl, 12.64.

Example IV

BIS(p-OCTYLPHENYL) PHOSPHOROCHLORIDITE AND p-OCTYLPHENYL PHOSPHORODICHLORIDITE

Two hundred sixty-five grams of p-octylphenol and 176 g. of phosphorus trichloride were mixed and heated gradually to a temperature of 70° C. over a period of 6 hours while gradually decreasing the pressure by means of a water aspirator pump to a final pressure of 30 mm.

The hydrogen chloride which was formed during reaction was almost completely removed. Total crude yield was 321 g.

Fractional distillation of 188 g. of the resulting mixture gave 36.2 g. of bis(p-octylphenyl) phosphorochloridite, B.P. 215–222° C./0.5 mm., and 65.9 g. of p-octylphenyl phosphorodichloridite, B.P. 132–150° C./1.5 mm., as well as other fractions which contained phosphorus trichloride and tris(p-octylphenyl) phosphite.

Example V

BIS(p-NONYLPHENYL) PHOSPHOROCHLORIDITE AND p-NONYLPHENYL PHOSPHORODICHLORIDITE

Four hundred grams of mixed nonyl-phenols (containing mostly para-isomers) and 123.4 g. of phosphorus trichloride were mixed and heated gradually to a temperature of 80° C. over a period of 4½ hours. During the last two hours of reaction, the pressure was gradually decreased by means of a water aspirator pump to a final pressure of 30 mm. The hydrogen chloride which was formed during reaction was nearly completely removed. The total crude yield was 450.4 g.

Fractional distillation of this mixture gave 172.5 g. of bis(p-nonylphenyl) phosphorochloridite, B.P. 220–231° C./0.15 mm., $n_D^{30.2°C.}$ 1.5238.

*Anal.*—Calc'd: P, 6.13; Cl, 7.02. Found: P, 6.07; Cl, 7.22.

There was also obtained 27.6 g. of p-nonylphenyl phosphorodichloridite, B.P. 130–135° C./0.15 mm., $n_D^{31.4°}$ C. 1.5139, $d_4^{20}$ 0.987.

*Anal.*—Calc'd: P, 9.65; Cl, 22.08. Found: P, 9.16, 8.92; Cl, 21.86.

Other fractions were obtained which contained phosphorus trichloride and tris(nonylphenyl) phosphite in addition to the two above described compounds.

Example VI

TECHNICAL MIXTURE OF BIS(p-OCTYLPHENYL) PHOSPHOROCHLORIDITE AND p-OCTYLPHENYL PHOSPHORODICHLORIDITE FROM 2:1 MIXTURE OF THE PHENOL AND $PCl_3$

To 68.7 g. of phosphorus trichloride was added at 55° C. a solution of 206.3 g. of p-octylphenol in 250 ml. of benzene over a period of one hour while evacuating the reaction flask very slightly to facilitate the removal of the hydrogen chloride which was liberated during the reaction. Heating at 55° C. was continued for a total of 5 hours, and the vacuum was gradually increased during the last hour so that at the end of this period a pressure of 120 mm. was obtained. The theoretical amount of hydrogen chloride and most of the benzene solvent was removed during the heating period. Finally, the vacuum was increased to 1 mm., and the pot temperature increased to 80° C. to remove the remaining benzene. The total crude yield was 221 g. This mixture was analyzed and shown to contain 2.47 milliequivalents of reactive chlorine (i.e. chlorine attached to phosphorus) per gram (quantitative distillation method).

Example VII

TECHNICAL MIXTURE OF BIS(p-OCTYLPHENYL) PHOSPHOROCHLORIDITE AND p-OCTYLPHENYL PHOSPHORODICHLORIDITE FROM 1:1 MIXTURE OF PHENOL AND $PCl_3$

This product was obtained as the crude yield in Example IV and contained 4.59 milliequivalents of reactive chlorine per gram.

Example VIII

TECHNICAL MIXTURE OF DI-m (AND d)-TOLYL PHOSPHOROCHLORIDITE AND m (AND p)-TOLYL PHOSPHORODICHLORIDITE FROM 2:1 MIXTURE OF PHENOL AND $PCl_3$

To a 137.4 g. of phosphorus trichloride was added with stirring 216.2 g. of a technical mixed m (and p)-cresol at 55° C. over a period of 3 hours, while maintaining a slight vacuum to facilitate the removal of the hydrogen chloride which was liberated. Heating at 55° C. was continued for a total of 6½ hours. The vacuum was gradually increased to a final pressure of 24 mm. during the last hour of heating to remove all of the hydrogen chloride. This mixture was shown to contain 2.33 milliequivalents of reactive chlorine per gram (quantitative distillation method).

Example IX

TECHNICAL MIXTURE OF DI-m (AND p)-TOLYL PHOSPHOROCHLORIDITE AND m (AND p)-TOLYL PHOSPHORODICHLORIDITE FROM 1:1 MIXTURE OF PHENOL AND $PCl_3$

To 137.4 g. of phosphorus trichloride was added 108.1 g. of a technical mixed m (and p)-cresol over a period of 40 minutes at a temperature of 55° C. while maintaining a slight vacuum to facilitate the removal of the hydrogen chloride. Heating at 55° C. was continued for a total of 5 hours. The vacuum was gradually increased during the last hour of heating to a final pressure of 60 mm. to remove all of the hydrogen chloride. This mixture was shown to contain 7.28 milliequivalents of reactive chlorine per gram.

Example X

TECHNICAL MIXTURE OF DIPHENYL PHOSPHOROCHLORIDITE AND PHENYL PHOSPHORODICHLORIDITE FROM 2:1 MIXTURE OF THE PHENOL AND $PCl_3$

To 687 g. of phosphorus trichloride was added with stirring at 40–45° C. 941 g. of molten phenol over a period of 40 minutes. The reaction mixture was warmed gradually to 75° C. over a period of 2½ hours. During this time a very slight vacuum was applied to facilitate removal of the hydrogen chloride. During the last hour of heating at 75° C. the vacuum was increased to a final pressure of 40 mm. to remove all of the hydrogen chloride. This mixture was shown to contain 3.28 milliequivalents of reactive chlorine per gram (Volhard method).

Example XI

TECHNICAL MIXTURE OF DIPHENYL PHOSPHOROCHLORIDITE AND PHENYL PHOSPHORODICHLORIDITE FROM 1:1 MIXTURE OF THE PHENOL AND $PCl_3$

To 686.8 g. of phosphorus trichloride was added with stirring at 30–35° C. 470.5 g. of molten phenol over a period of 25 minutes. The reaction mixture was warmed to 75° C. over a period of 10 minutes, and maintained at this temperature for 1½ hours at atmospheric pressure. During the next 1½ hours at 60° C., the pressure was gradually decreased to 47 mm. to remove the last of the hydrogen chloride. This mixture was shown to contain 6.83 milliequivalents of reactive chlorine per gram (Volhard method).

Data concerning more aryl phosphorochloridites prepared by Method B is presented in the table below.

DATA ON ARYL PHOSPHOROCHLORIDITES

| Name | Alcohol used | Ratio of phenol to $PCl_3$ (Molar) | Temp. range (°C.) | Total reaction time (hours) | Percent yield of expected product [1] | °C. $n_D$ | °C. $d_4$ | Boiling point °C./mm. |
|---|---|---|---|---|---|---|---|---|
| Phenyl phosphorodichloridite | Phenol | 1:1 | 45–95 | 4.25 | 26.2 | | | 60/0.23 |
| Diphenyl phosphorochloridite | ___do___ | 1:1 | 45–95 | 4.25 | 10.3 | $n_D^{24}$ 1.5774 | $d_4^{30}$ 1.246 | 122/0.45 |
| Tolyl phosphorodichloridite | Cresol | 1:1 | 19–70 | 1.67 | 41.5 | $n_D^{23}$ 1.5538 | $d_4^{20}$ 1.287 | 72/0.30 |
| Ditolyl phosphorochloridite | ___do___ | 1:1 | 19–70 | 1.67 | 21.8 | | | 146/0.30 |
| Isopropylphenyl phosphorodichloridite | Isopropylphenol | 1:1 | 10–50 | 3.5 | 38.5 | $n_D^{26}$ 1.5378 | $d_4^{20}$ 1.227 | 90–92/0.04 |
| Bis(isopropylphenyl) phosphorochloridite | ___do___ | 1:1 | 10–50 | 3.5 | 21.2 | $n_D^{26}$ 1.5450 | $d_4^{20}$ 1.104 | 177–182/0.23 |
| p-Tert-butylphenyl phosphorodichloridite | p-Tert-butylphenol | 1:1 | 40 | 2.0 | 34.0 | $n_D^{33}$ 1.5333 | $d_4^{20}$ 1.188 | 87–92/0.15 |
| Bis(p-tert-butylphenyl) phosphorochloridite | ___do___ | 1:1 | 40 | 2.0 | 26.8 | $n_D^{33}$ 1.5398 | $d_4^{26}$ 1.086 | 180–181.5/0.01 |
| p-Octylphenyl phosphorodichloridite | p-(Octyl) phenol | 1:1 | 19–50 | 6.1 | 41.8 | $n_D^{25.5}$ 1.5242 | $d_4^{20}$ 1.124 | 130/0.07 |
| Bis(p-octylphenyl) phosphorochloridite | Octylphenol | 1:1 | 19–50 | 6.1 | 22.1 | $n_D^{26.5}$ 1.5292 | $d_4^{20}$ 1.030 | 220/0.11 |

[1] Percent yield was calculated assuming only one product was formed.

By the process of our invention the aryl phosphorochloridites prepared by either of the above two methods, either in a purified form or as a crude reaction product, may be smoothly converted to alkyl or alkenyl aryl phosphites without the use of expensive tertiary organic bases or difficult-to-handle alkali metal alkoxides. In our process we use the cheap, readily available, anhydrous ammonia. Our procedure provides a commercially practical method of preparing in high yields tertiary alkyl and alkenyl aryl phosphites substantially free of secondary esters.

Broadly stated we simultaneously add ammonia and an aryl phosphorochloridite to an aliphatic alcohol. Reactions of the mono and diaryl phosphorochloridites may be represented by the following equations:

(1) $ArOPCl_2 + 2ROH + 2NH_3 \rightarrow ArOP(OR)_2 + 2NH_4Cl$ (2) $(ArO)_2PCl + ROH + NH_3 \rightarrow (ArO)_2POR + NH_4Cl$ In addition to the useful aliphatic aryl phosphites obtained by the reactions, by-product ammonium chloride can be recovered and used as a fertilizer material or treated with alkali or lime to regenerate ammonia for reuse.

Anhydrous ammonia as an agent for removal of hydrogen chloride liberated in these reactions has heretofore been considered impractical since it reacts under ordinary conditions with aryl phosphorochloridites to form aryl phosphoramidous compounds. Illustrative reactions are as follows:

(1) $ArOPCl_2 + 4NH_3 \rightarrow ArOP(NH_2)_2 + 2NH_4Cl$ (2) $(ArO)_2PCl + 2NH_3 \rightarrow (ArO)_2PNH_2 + NH_4Cl$ Undoubtedly many more complex reactions also occur.

It should be clearly understood that tertiary amines commonly used in laboratory practice are not subject to reaction with aryl phosphorochloridites in the above manner since these tertiary amines have no replaceable hydrogen on the nitrogen atom. This invention therefore has accomplished the removal of the corrosive hydrogen chloride generated in the reaction and at the same time has obviated the undesirable reactions of ammonia with aryl phosphorochloridites.

Our invention, more specifically, comprises the preparation of alkyl and alkenyl aryl phosphites by the addition of aryl phosphorochloridites to at least the theoretical amount of an aliphatic alcohol, which may or may not be diluted with an inert solvent, accompanied by the simultaneous addition of dry ammonia so that the liberated hydrogen chloride is just neutralized. The ammonium chloride formed is removed and upon evaporation of solvent or excess alcohol, an aliphatic aryl triester is obtained which is relatively free of diester and phosphorus amido compounds. This product may be further purified by simple distillation.

In carrying out the process of this invention the optimum temperature varies with the amount of solvent used, the efficiency of stirring during the mixing of the reactants, and with the number of carbon atoms contained in the aliphatic chain of the alcohol. Generally the optimum temperature lies within the range from about −10° C. to about 60° C.

With regard to the quantities of reagents used, at least the theoretical amount of alcohol should be used. An excess of alcohol gives satisfactory results.

Many inert solvents, e.g. ether, hexane, heptane, benzene, toluene, etc., are suitable for diluting the alcohol before reaction. A large excess of alcohol may serve as a solvent. However, alcohols solubilize ammonium chloride to some extent and thus the use of excess alcohol makes complete removal of this salt difficult. Ammonium chloride is most conveniently removed by washing with water. Since phosphites which contain aliphatic groups are somewhat sensitive to acid hydrolysis in contact with water, it is preferred that wash solutions be maintained in an alkaline state by the addition of a suitable amount of alkali metal hydroxide, alkaline earth metal hydroxide, or other suitable base.

When an inert solvent is used, it is preferred to dilute not only the reactant alcohol but also the aryl phosphorochloridite with the inert solvent. While large excesses of inert solvents give uniformly good results, the use of too small an amount in some cases prevents good stirring and permits localized attack of the hydrogen chloride on the product triester. The minimum amount of solvent required for best results increases as the efficiency of stirring decreases and decreases as the reaction temperatures are lowered. Generally speaking, in the usual procedure the use of 2 to 3 parts of solvent per part of final product expected gives satisfactory results.

The rate of ammonia addition is regulated so that the reaction mixture stays essentially at the neutral point. If the reaction mixture is allowed to remain quite acidic during the entire reaction, almost none of the desired triester is obtained. Instead the corresponding diester (one alkyl group is removed from the triester) is the main product. If the reaction mixture is allowed to remain quite basic, or even under a positive pressure of ammonia, the yield of triester is unsatisfactory and the final product is frequently contaminated with phosphoramidous side-reaction products.

We have found that for laboratory operations a convenient way to control and balance the ammonia and aryl phosphorochloridite additions, so that neutral conditions are maintained, is by the use of a suitable acid-base indicator added to the reaction mixture. While many indicators can be made to serve, the azo types, e.g. methyl red and methyl orange, give the most easily followed color changes. These indicators are very sensitive giving their characteristic acid color in the presence of hydrogen chloride (i.e. aryl phosphorochloridite) and their characteristic basic color in the presence of excess ammonia. The phthalein type indicators, e.g. alizarin red S, bromcresol purple, bromthymol blue, thymol blue and thymolphthalein, tend to decolorize or give less satisfactory color changes during the course of the reaction. Malachite green and p-nitrophenol also are less satisfactory than the azo type indicators mentioned above.

While the invention is illustrated by the indicator method of observing and maintaining neutral conditions of reactions, the invention is not limited to this method since any method of observing and maintaining neutral conditions (conductiometric, spectrophotometric, electronic, simple stoichiometric addition, etc.) falls within the scope of our invention.

The aliphatic aryl phosphite products of our invention are useful in the preservation of synthetic rubber-like (elastomeric) latex materials and more particularly those derived from modified 1,3-diene polymers which are formed from the polymerization of conjugated dienes, especially those known to the trade as Buna S (GRS) Latex. The various synthetic elastomers are known by the art to be produced in various manners. The present invention is not concerned with the particulars of producing these elastomers but in their preservation as stated above.

The triaryl phosphites have been used for the preservation of synthetic rubbers. The compounds of our invention are superior to these triaryl phosphites, as will be illustrated, and in addition our aliphatic aryl phosphites serve to actually bring about a bleachng-out of the rubber color as aging progresses. Normally all synthetic rubber stocks gradually darken on aging. This darkening is definitely harmful to the sale of these stocks for use in white or light-colored products. As will be illustrated, even the stabilized or preserved rubber stocks which contain the triaryl phosphites measurably darken on aging. The compounds of our invention, however, show a very definite, measurable, and reproducible improvement of color on aging. Instead of a mere decrease in normal darkening with age the aliphatic aryl phosphites of our invention actually improve the original color and the result is a bleaching-out as the rubber ages.

This result is new and unpredictable from anything heretofore reported in the art. Commercially this is a highly useful result and enables rubber products which contain the aliphatic aryl phosphites of our invention to be used for white and light-colored, for example light pastel dyed, rubber objects.

Furthermore synthetic rubber latex compounded to contain the products of our invention shows a Mooney viscosity change which is different from that of similar stocks compounded with the triaryl phosphites of the prior art. As is illustrated below the Mooney viscosity of an unstabilized material gradually rises indicating an equally gradual undesirable toughening on aging. The rubber sample which contains the triaryl phosphite of the prior art first softened (drop in Mooney) and then rose back to a fairly constant level. The aliphatic aryl phosphites of our invention prevent the rise in Mooney without the initial dip or softening shown by the triaryl stabilized products. This is new, unusual and unpredictable from the prior art and indicates a more stable product and more stabilizing activity by the aliphatic aryl phosphites of our invention.

The aliphatic aryl phosphite stabilizer (1.25% by weight based on the latex solids) was added in the form of an aqueous dispersion to GR–S–734 Latex. The latex was adjusted to a pH of 10 (±0.2) and the polymer was co-agulated with brine and acid to form a granular precipitate which was washed thoroughly, dried in a 60° C. circulating air oven and sheeted out on a rubber mill (ref. Reconstruction Finance Corp. Report AU–926, Project 407–S, April 16, 1951). The following table illustrates the stabilizing activity of the aliphatic aryl phosphites as compared to the triaryl phosphites of the prior art and also unstabilized material.

| Sample | Hours aging at 100° C. | Color [1] | Surface film or crust | Mooney viscosity 100° C. |
|---|---|---|---|---|
| Control (no stabilizer) | 0 | 3 | None | 47 |
| | 2 | 3 | Yes | 46 |
| | 4 | 4 | Yes | 47 |
| | 8 | 4 | Yes | 48 |
| | 24 | 5 | Yes | 49 |
| | 48 | 5 | Yes | 50 |
| Tris(p-octylphenyl)phosphite (Commercial product predominantly this compound). | 0 | 1 | None | 45 |
| | 2 | 1 | None | 42 |
| | 4 | 2 | None | 38 |
| | 8 | 2 | None | 39 |
| | 24 | 2 | None | 41 |
| | 48 | 2 | None | 42 |
| 2-ethylhexyl bis(p-octylphenyl phosphite. | 0 | 2 | None | 44 |
| | 2 | 1 | None | 44 |
| | 4 | 1 | None | 45 |
| | 8 | 0 | None | 46 |
| | 24 | 0 | None | 41 |
| | 48 | 0 | None | 44 |
| 2-ethylhexyl diphenyl phosphite | 0 | 3 | None | 47 |
| | 2 | 2 | None | 47 |
| | 4 | 1 | None | 47 |
| | 8 | 0 | None | 47 |
| | 24 | 0 | None | 49 |
| | 48 | 0 | None | 46 |
| Bis(2-ethylhexyl) phenyl phosphite | 0 | 3 | None | 43 |
| | 2 | 3 | None | 42 |
| | 4 | 1 | None | 44 |
| | 8 | 0 | None | 44 |
| | 24 | 0 | None | 45 |
| | 48 | 0 | None | 43 |

[1] Color: 0=no color, excellent; 1=slight color, very good; 5=poor, dark color.

All of the compounds of our invention show activity and results similar to those shown in the foregoing table.

The general experimental write-up below shows the procedure used in the preparation of the pure monoalkyl diaryl phosphites and the pure dialkyl monoaryl phosphites of our invention.

*Procedure for Preparation of Pure Monoalkyl Diaryl Phosphites and Pure Dialkyl Monoaryl Phosphites*

The appropriate pure mono or diaryl phosphorochloridite, alone or dissolved in an inert solvent, was added dropwise, with stirring, to at least a chemically equivalent amount of the appropriate alcohol. The alcohol was diluted with an inert solvent or excess alcohol was used as its own solvent. A sufficient amount of methyl red indicator was present to denote change from basicity to acidity. Reaction temperature varied from about 0° C. to about 60° C. Simultaneously with the addition of the phosphorochloridite, dry ammonia gas was bubbled into the reaction mixture in an amount sufficient to maintain the reaction mixture just basic to methyl red.

Upon completing the addition, stirring was continued for a short period. Total reaction time varied from about 5 minutes to about 73 minutes.

The vigorously stirred reaction mixture was then washed with the calculated amount of 3.5% NaOH solution and/or 5% NaOH solution and/or 10% NaOH solution and/or 20% NaOH solution. Approximately 250 ml. of 3.5% NaOH was used for every mole of $NH_4Cl$ formed. Approximately 50 ml. of 10% NaOH was used for every mole of $NH_4Cl$ formed.

The water and oil layers were separated. The oil layer was freed of inert solvent or excess alcohol by reduced pressure distillation at a pot temperature of about 90–97° C. and at 2–20 mm. pressure.

Distillation of the remaining oil gave the pure monoalkyl diaryl phosphite or the dialkyl monoaryl phosphite, depending upon the starting materials used.

Our invention is illustrated with respect to both the broad process and the relatively limited groups of useful esters by the following examples:

A. DIALKYL MONOARYL PHOSPHITES

Example XII

BIS(2-ETHYLHEXYL) PHENYL PHOSPHITE

Sixty-five grams of phenyl phosphorodichloridite prepared as described in Example I was dissolved in 100 ml. of hexane, and this solution was added dropwise to a stirred solution of 79 g. of 2-ethylhexanol and 0.1 g. of methyl red indicator in 100 ml. of hexane at a sufficient rate to keep the temperature at from 0° to 5° C. while cooling with an ice-salt bath. Simultaneously, dry ammonia gas was bubbled into the reaction mixture at a sufficient rate to maintain the mixture just basic to methyl red. A period of 63 minutes was required for this addition. The reaction mixture was stirred for an additional 10 minutes after reaction, and the temperature was allowed to increase to about 20° C.

To the vigorously stirred mixture was then added 200 ml. of 20% sodium hydroxide solution, and stirring was continued for 10 minutes. The water and oil layers were separated. The oil layer was freed of hexane by distillation to a pot temperature of 100° C. at 20 mm., and the remaining oil was vacuum distilled. One hundred and one grams of bis(2-ethylhexyl) phenyl phosphite was obtained, $n_D^{26°\ C.}$ 1.4791, $d_4^{20}$ 0.964, B.P. 148–156° C./0.06 mm.

*Anal.*—Calc'd equivalent weight (iodometry): 191.3. Found: 196.2, 192.1.

Example XIII

BIS(2-ETHYLHEXYL) o-TOLYL PHOSPHITE

A solution of 16.7 g. of the o-tolyl phosphorodichloridite prepared in Example III in 40 ml. of hexane was added dropwise to a stirred solution of 21 g. of 2-ethylhexanol, and 0.1 g. of methyl red indicator in 40 ml. of hexane at a sufficient rate to maintain a temperature of from 0° to 5° C. while cooling with an ice-salt bath. Simultaneously, dry ammonia gas was bubbled into the reaction mixture at a sufficient rate to keep the solution just basic to methyl red. Twenty-eight minutes was required for this addition. The reaction mixture was stirred for an additional 10 minutes, and the temperature allowed to increase to about 20° C.

To the vigorously stirred mixture was added 50 ml. of 5% sodium hydroxide solution, and stirring was continued for 10 minutes. The water and oil layers were separated, and the hexane was removed from the oil layer by distillation to a pot temperature of 80° C. at 20 mm. Distillation of the residue gave 26.7 g. of bis(2-ethylhexyl) o-tolyl phosphite $n_D^{30.9°\ C.}$ 1.4749, $d_4^{20}$ 0.954, B.P. 143–148° C./0.05 mm.

*Anal.*—Calc'd.: P, 7.81. Found: P, 8.07, 8.12. Calc'd equivalent weight (iodometry): 198.3. Found: 213.8, 214.0.

Example XIV

BIS(2-ETHYLHEXYL) p-TOLYL PHOSPHITE

A solution of 20.9 g. of the p-tolyl phosphorodichloridite from Example II in 45 ml. of hexane was added dropwise to a stirred solution of 27 g. of 2-ethylhexanol and 0.1 g. of methyl red indicator in 45 ml. of hexane at a sufficient rate to maintain the temperature at from 0° to 5° C. while cooling with an ice-salt bath. Simultaneously, dry ammonia gas was bubbled into the reaction mixture at a sufficient rate to keep the solution just basic to methyl red. Thirty minutes was required for this addition. The reaction mixture was stirred for an additional 10 minutes, and the temperature allowed to increase to about 15° C.

To the vigorously stirred reaction mixture was then added 65 ml. of 5% sodium hydroxide solution, and stirring was continued for 15 minutes. The water and oil layers were separated, and the hexane was removed from the oil layer by distillation to a pot temperature of 100° C. at 20 mm. The resulting oil on distillation gave 27.9 g. of bis(2-ethylhexyl) p-tolyl phosphite, $n_D^{30.7°\ C.}$ 1.4738, $d_4^{20}$ 0.946.

*Anal.*—Calc'd.: P, 7.81. Found: 7.55. Calc'd equivalent weight (iodometry): 198.3. Found: 202.0, 200.8.

Example XV

BIS(2-ETHYLHEXYL) p-OCTYLPHENYL PHOSPHITE

A solution of 96.3 g. of p-octylphenyl phosphorodichloridite, prepared as in Example IV in 186 ml. of hexane was added dropwise to a stirred solution of 81.7 g. of 2-ethylhexanol and 0.1 g. of methyl red indicator in 186 ml. of hexane. The addition was carried out at such a rate as to keep the temperature of the reaction mixture at 8–12° C. Simultaneously, dry ammonia gas was bubbled into the reaction mixture at a sufficient rate to maintain the solution just basic to methyl red. Seventeen minutes was required for this addition. The reaction mixture was stirred for 10 minutes, and the temperature was allowed to increase to about 20° C.

To the vigorously stirred mixture was added 157 ml. of 3.5% sodium hydroxide solution, and stirring was continued for 10 minutes. An emulsion was obtained, and separation of the water and oil layers was accomplished with some difficulty. The hexane was removed from the oil layer by distillation at a pressure of 20 mm. to a pot temperature of 100° C. The product bis(2-ethylhexyl) p-octylphenyl phosphite weighed 129 g. $n_D^{25°\ C.}$ 1.4828, $d_4^{20}$ 0.935.

*Anal.*—Calc'd equivalent weight (iodometry): 265.58. Found: 280.5, 280.5.

The table below gives experimental and analytical data on additional dialkyl monoaryl phosphites that were prepared by the same general experimental procedure as shown previously.

DIALKYL MONOARYL PHOSPHITES OF THE GENERAL FORMULA

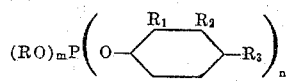

| Identifying variables | | | | | | Molar ratio alcohol: chloridite | Reaction time min. | Temp. range (° C.) | Amt. 3.5% NaOH used (ml.) | Amt. 10% NaOH used (ml.) | Percent yield |
|---|---|---|---|---|---|---|---|---|---|---|---|
| R | $R_1$ | $R_2$ | $R_3$ | $m$ | $n$ | | | | | | |
| 2-ethylhexyl | H or $CH_3$ | H or $CH_3$ | H or $CH_3$ | 2 | 1 | 2.0:1.0 | 25 | 50–60 | 125 | 50 | 94.7 |
| n-Octyl | H | H | Isopropyl | 2 | 1 | 2.0:1.0 | 30 | 10–15 | 167 | | 87.8 |
| Do | H | H | tert-Butyl | 2 | 1 | 2.0:1.0 | 35 | 10–15 | 250 | 50 | 93.5 |
| Nonyl | H | H | H | 2 | 1 | 2.0:1.0 | 17 | 10–15 | 125 | 25 | 95.6 |
| Do | H or $CH_3$ | H or $CH_3$ | H or $CH_3$ | 2 | 1 | 2.0:1.0 | 17 | 10–15 | 125 | 25 | 84.2 |
| Do | H | H | Octyl | 2 | 1 | 2.0:1.0 | 10 | 10–15 | 100 | 20 | 77.8 |
| Decyl | H | H | H | 2 | 1 | 2.0:1.0 | 15 | 10–15 | 125 | 25 | 97.6 |
| Do | H or $CH_3$ | H or $CH_3$ | H or $CH_3$ | 2 | 1 | 2.0:1.0 | 20 | 10–15 | 125 | 25 | 94.2 |
| Do | H | H | Octyl | 2 | 1 | 2.0:1.0 | 17 | 10–15 | 100 | 20 | 87.3 |
| Dodecyl | H or $CH_3$ | H or $CH_3$ | H or $CH_3$ | 2 | 1 | 2.0:1.0 | 30 | 5–10 | 100 | 20 | 73.5 |
| Octadecyl | H | H | Isopropyl | 2 | 1 | 2.0:1.0 | 15 | 5–10 | 167 | | 81.8 |
| Do | H | H | tert-Butyl | 2 | 1 | 2.0:1.0 | 10 | 20–22 | 125 | 50 | 93.7 |
| Do | H | H | Octyl | 2 | 1 | 2.0:1.0 | 30 | 20–27 | 166.6 | 33.3 | 80.0 |

| Identifying variables | | | | | | Equivalent weight | | $n_D°$ C. | $d_4^{20}$ | Analytical (percent) | |
|---|---|---|---|---|---|---|---|---|---|---|---|
| R | $R_1$ | $R_2$ | $R_3$ | $m$ | $n$ | Calc'd. | Found | | | Calc'd. | Found |
| 2-ethylhexyl | H or $CH_3$ | H | H or $CH_3$ | 2 | 1 | | | | | | |
| n-Octyl | H | H | Isopropyl | 2 | 1 | 212.3 | 239.9, 238.0 | $n_D^{29}$ 1.4742 | 0.936 | | |
| Do | H | H | tert-Butyl | 2 | 1 | 219.3 | 275.5, 290.0 | $n_D^{29}$ 1.4750 | 0.936 | C, 71.2 H, 10.8 P, 7.06 | 70.9, 71.1 10.8, 10.6 7.00, 6.98 |
| Nonyl | H | H | H | 2 | 1 | 205.3 | 226.0, 224.6 | $n_D^{21.9}$ 1.4714 | 0.933 | | |
| Do | H or $CH_3$ | H or $CH_3$ | H or $CH_3$ | 2 | 1 | 212.3 | 227.5, 230.0 | $n_D^{21.9}$ 1.4730 | 0.936 | | |
| Do | H | H | Octyl | 2 | 1 | 261.4 | 295.2, 298.0 | $n_D^{32}$ 1.4756 | 0.920 | | |
| Decyl | H | H | H | 2 | 1 | 219.3 | 247.0, 246.8 | $n_D^{32}$ 1.4732 | 0.936 | | |
| Do | H or $CH_3$ | H or $CH_3$ | H or $CH_3$ | 2 | 1 | 226.3 | 234.3, 235.5 | $n_D^{32.2}$ 1.4764 | 0.940 | | |
| Do | H | H | Octyl | 2 | 1 | 275.4 | 287.7, 292.0 | $n_D^{32.5}$ 1.4771 | 0.922 | | |
| Dodecyl | H or $CH_3$ | H or $CH_3$ | H or $CH_3$ | 2 | 1 | 272.6 | 387.9, 385.4 | $n_D^{33}$ 1.4759 | 0.913 | | |
| Octadecyl | H | H | Isopropyl | 2 | 1 | 352.6 | 387.5, 381.4 | | | P, 4.39 C, 76.65 H, 12.15 | 4.24 76.42 12.36 |
| Do | H | H | tert-Butyl | 2 | 1 | 359.6 | 437.0, 436.5 | $n_D^{29}$ 1.4733 | | C, 76.82 H, 12.19 P, 4.31 | 76.94, 76.99 12.10, 11.92 4.18, 4.22 |
| Do | H | H | Octyl | 2 | 1 | 387.6 | 463.0, 396.3 | | | C, 77.46 H, 12.35 P, 3.99 | 77.16 12.50 3.82 |

B. MONOALKYL DIARYL PHOSPHITES

*Example XVI*

ALLYL DI-o-TOLYL PHOSPHITE

A solution of 50.5 g. of the di-o-tolyl phosphorochloridite prepared in Example III in 79 ml. of hexane was added dropwise to a stirred solution of 10.7 g. of allyl alcohol and 0.1 g. of methyl red indicator in 70 ml. of hexane at a rate sufficient to maintain a temperature of from 0° to 5° C. while cooling with an ice-salt bath. Simultaneously, dry ammonia gas was bubbled into the reaction mixture at a rate sufficient to keep the solution just basic to methyl red. A period of 43 minutes was required for this addition. The reaction mixture was stirred for an additional 10 minutes, and the temperature was allowed to increase to about 10° C.

To the vigorously stirred mixture was added 150 ml. of 5% sodium hydroxide solution, and stirring was continued for 15 minutes. The water layer was separated, and the oil layer freed of hexane by distillation to a pot temperature of 95° C. at 50 mm. The residue was fractionally distilled to give 18.2 g. of allyl di-o-tolyl phosphite, $n_D^{32°\ C.}$ 1.5453, B.P. 120–127° C./0.05 mm.

*Analysis.*—Calc'd: P, 10.23. Found: 10.28. Calc'd equivalent weight (iodometry): 151.2. Found: 153.0, 152.9.

*Example XVII*

ALLYL BIS(p-NONYLPHENYL) PHOSPHITE

A solution of 60. g. of the bis(p-nonylphenyl) phosphorochloridite prepared in Example V in 100 ml. of hexane was added dropwise to a stirred solution of 6.9 g. of allyl alcohol and 0.1 g. of methyl red indicator in 100 ml. of hexane at a rate sufficient to maintain a temperature of from 0° to 5° C. while cooling with an ice-salt bath. Simultaneously, dry ammonia gas was bubbled into the reaction mixture at a rate sufficient to keep it just basic to methyl red. A period of 30 minutes was required for this addition. The reaction mixture was stirred for an additional 15 minutes, and the temperature was allowed to increase to 20° C. The ammonium chloride was removed by filtrations, and the filtrate was clarified by treatment with activated charcoal. The hexane was removed by distillation to a pot temperature of 100° C. at 50 mm. to give 38 g. of allyl bis(p-nonylphenyl) phosphite, $n_D^{25.5°\ C.}$ 1.5100.

*Analysis.*—Calc'd: P, 5.88. Found: P, 5.83. Calc'd equivalent weight (iodometry): 263.4. Found: 292.1, 291.9.

*Example XVIII*

3-CYCLOHEXEN-1-YLMETHYL DI-o-TOLYL PHOSPHITE

A solution of 28.1 g. of the di-o-tolyl phosphorochloridite prepared in Example III in 75 ml. of hexane was added dropwise to a stirred solution of 11.2 g. of 3-cyclohexen-1-methanol and 0.1 g. of methyl red indicator in 75 ml. of hexane at a rate sufficient to maintain a temperature of from 0° to 5° C. while cooling with an ice-salt bath. Simultaneously, dry ammonia gas was bubbled into the reaction mixture at a sufficient rate to keep it just basic to methyl red. A period of 37 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with activated charcoal. The hexane was removed from this product by distillation to a pot temperature of 90° C. at 40 mm. to give 30.0 grams of 3-cyclohexen-1-ylmethyl di-o-tolyl phosphite as an undistilled residue, $n_D^{25.5°\ C.}$ 1.5516.

*Analysis.*—Calc'd: P, 8.69. Found: 8.82. Calc'd equivalent weight (iodometry): 178.2. Found: 192.3, 191.0.

Example XIX

2-ETHYLHEXYL DIPHENYL PHOSPHITE

Fifty grams of the diphenyl phosphorochloridite prepared in Example I was dissolved in 90 ml. of hexane, and this solution was added dropwise to a stirred mixture of 26.1 g. of 2-ethylhexanol and 0.1 g. of methyl red indicator in 90 ml. of hexane at a sufficient rate to maintain a temperature of from 0° to 5° C. while cooling with an ice-salt bath. Simultaneously, dry ammonia gas was bubbled into the reaction mixture at a sufficient rate to keep the solution just basic to methyl red. Thirty minutes was required for this addition. The reaction mixture was stirred for an additional 10 minutes, and the temperature was allowed to increase to about 10° C.

To the vigorously stirred mixture was then added 150 ml. of a 10% solution of sodium hydroxide, and stirring was continued for 10 minutes. The water and oil layers were then separated and the oil layer was freed of hexane by distillation to a pot temperature of 90° C. at 20 mm. The remaining oil on distillation gave 51.5 g. of 2-ethylhexyl diphenyl phosphite, $n_D^{27.4°\,C.}$ 1.5207, $d_4^{20}$ 1.054, B.P. 148–156° C./0.15 mm.

*Analysis.*—Calc'd equivalent weight (iodometry): 173.3. Found: 193.5.

Example XX

2-ETHYLHEXYL DI-o-TOLYL PHOSPHITE

A solution of 28.1 g. of di-o-tolyl phosphorochloridite from Example III, in 45 ml. of hexane was added dropwise to a stirred solution of 13.5 g. of 2-ethylhexanol and 0.1 g. of methyl red indicator in 45 ml. of hexane at a rate sufficient to maintain a temperature of from 0° to 10° C. while cooling with an ice-salt bath. Simultaneously, dry ammonia gas was bubbled into the reaction mixture at a rate sufficient to keep the solution just basic to methyl red. Twenty-two minutes was required for this addition. The reaction mixture was stirred for an additional 15 minutes, and the temperature was allowed to increase to about 20° C. The ammonium chloride was then removed by filtration, and the filtrate was freed of hexane by distillation to a pot temperature of 100° C. at 20 mm. Distillation of the residue gave 33 g. of 2-ethylhexyl di-o-tolyl phosphite, $n_D^{27.2°\,C.}$ 1.5164, $d_4^{20}$ 1.027, B.P. 146–150° C./0.05 mm.

*Analysis.*—Calc'd equivalent weight (iodometry): 187.2. Found: 194.0, 193.3.

Example XXI

2-ETHYLHEXYL DI-p-TOLYL PHOSPHITE

Twenty-eight grams of the di-p-tolyl phosphorochloridite prepared in Example II was dissolved in 45 ml. of hexane, and this solution was added dropwise to a stirred mixture of 13.5 g. of 2-ethylhexanol, and 0.1 g. of methyl red indicator in 45 ml. of hexane at a sufficient rate to maintain a temperature of from 0° to 5° C. while cooling with an ice-salt bath. Simultaneously, dry ammonia gas was bubbled into the reaction mixture at a rate sufficient to keep it just basic to methyl red. Twenty-five minutes was required for this addition. The reaction mixture was stirred for an additional 10 minutes, and the temperature was allowed to increase to about 10° C.

To the vigorously stirred mixture was added 50 ml. of 5% sodium hydroxide solution, and stirring was continued for 10 minutes. The water layer was separated, and the hexane was removed by distillation to a pot temperature of 100° C. at 20 mm. Distillation of the residue gave 26.9 g. of 2-ethylhexyl di-p-tolyl phosphite, $n_D^{30.8°\,C.}$ 1.5191, $d_4^{20}$ 1.032.

*Analysis.*—Calc'd: P, 8.27. Found: 8.22. Calc'd equivalent weight (iodometry): 187.2. Found: 198.6, 197.8.

Example XXII

2-ETHYLHEXYL BIS(p-OCTYLPHENYL) PHOSPHITE

A solution of 36.2 g. of the bis(p-octylphenyl) phosphorochloridite prepared in Example IV in 75 ml. of hexane was added dropwise to a stirred solution of 9.9 g. of 2-ethylhexanol and 0.1 g. of methyl red indicator in 75 ml. of hexane at such rate as to keep the temperature of the reaction mixture at from 8° to 12° C. while cooling with an ice-salt bath. Simultaneously, dry ammonia gas was bubbled into the reaction mixture at a sufficient rate to keep the solution just basic to methyl red. Fifty minutes was required for this addition. The reaction mixture was stirred for an additional 15 minutes, and the temperature was allowed to increase to about 20° C. The ammonium chloride was removed by filtration, and the filtrate was decolorized by treatment with activated charcoal, and then freed of hexane by distillation to a pot temperature of 90° C. at 20 mm. Thirty-three grams of 2-ethylhexyl bis(p-octylphenyl) phosphite was obtained as an undistilled product, $n_D^{26°\,C.}$ 1.5037, $d_4^{20}$ 0.960.

*Analysis.*—Calc'd equivalent weight (iodometry): 285.4. Found: 339, 336.

The table below gives experimental and analytical data on additional monoalkyl diaryl phosphites that were prepared by the same general experimental procedure as shown previously.

MONOALKYL DIARYL PHOSPHITES OF THE GENERAL FORMULA

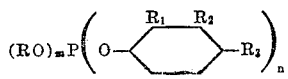

| Identifying variables | | | | | | Molar ratio alcohol: chloridite | Reaction time min. | Temp. range (° C.) | Amt. 3.5% NaOH used (ml.) | Amt. 10% NaOH used (ml.) | Percent yield |
|---|---|---|---|---|---|---|---|---|---|---|---|
| R | $R_1$ | $R_2$ | $R_3$ | m | n | | | | | | |
| n-Octyl | H | H | Isopropyl | 1 | 2 | 1.0:1.0 | 15 | 5–10 | 44.5 | 8.9 | 84.7 |
| Do | H | H | tert-Butyl | 1 | 2 | 1.0:1.0 | 20 | 10–15 | 75 | 15 | 90.7 |
| Nonyl | H | H | H | 1 | 2 | 1.0:1.0 | 5 | 10–15 | 62.5 | 12.5 | 89.0 |
| Do | H or $CH_3$ | H or $CH_3$ | H or $CH_3$ | 1 | 2 | 1.0:1.0 | 10 | 10–15 | 62.5 | 12.5 | 83.1 |
| Do | H | H | Octyl | 1 | 2 | 1.0:1.0 | 10 | 0–10 | 41.9 | 8.4 | 99.4 |
| Decyl | H | H | H | 1 | 2 | 1.0:1.0 | 10 | 10–15 | 62.5 | 12.5 | 83.0 |
| Do | H or $CH_3$ | H or $CH_3$ | H or $CH_3$ | 1 | 2 | 1.0:1.0 | 10 | 10–15 | 50 | 10 | 85.3 |
| Do | H | H | Octyl | 1 | 2 | 1.0:1.0 | 15 | 0–10 | 41.9 | 8.4 | 99.0 |
| Octadecyl | H | H | Isopropyl | 1 | 2 | 1.0:1.0 | 15 | 10–15 | 44.5 | 8.9 | 90.6 |
| Do | H | H | tert-Butyl | 1 | 2 | 1.0:1.0 | 10 | 15–20 | 83.3 | 16.6 | 95.7 |

| Identifying variables | | | | | | Equivalent weight | | $n_D°$ C. | $d_4^{20}$ | Analytical (percent) | |
|---|---|---|---|---|---|---|---|---|---|---|---|
| R | R₁ | R₂ | R₃ | m | n | Calc'd. | Found | | | Calc'd. | Found |
| n-Octyl | H | H | Isopropyl | 1 | 2 | 215.3 | 264.0, 262.0 | $n_D^{28}$ 1.5100 | 0.994 | | |
| Do | H | H | tert-Butyl | 1 | 2 | 229.3 | 267, 268.3 | $n_D^{29.5}$ 1.5091 | 0.991 | C, 73.3 | 73.5, 73.3 |
| | | | | | | | | | | H, 9.45 | 9.44, 9.61 |
| | | | | | | | | | | P, 6.75 | 6.66, 6.73 |
| Nonyl | H | H | H | 1 | 2 | 180.1 | 192.6, 193.0 | $n_D^{31.9}$ 1.5158 | 1.033 | | |
| Do | H or CH₃ | H or CH₃ | H or CH₃ | 1 | 2 | 194.2 | 228.5, 227.0 | $n_D^{32}$ 1.5095 | 1.009 | | |
| Do | H | H | Octyl | 1 | 2 | 277.4 | 334.0, 344.0 | $n_D^{26}$ 1.5010 | 0.947 | | |
| Decyl | H | H | H | 1 | 2 | 187.1 | 199.0, 199.6 | $n_D^{32.1}$ 1.5138 | 1.025 | | |
| Do | H or CH₃ | H or CH₃ | H or CH₃ | 1 | 2 | 201.2 | 219.0, 222.0 | $n_D^{32.4}$ 1.5095 | 1.005 | | |
| Do | H | H | Octyl | 1 | 2 | 299.4 | 362.0, 360.0 | $n_D^{28}$ 1.5019 | 0.953 | | |
| Octadecyl | H | H | Isopropyl | 1 | 2 | 285.4 | 373.2, 370.0 | | | P, 5.43 | 5.21 |
| | | | | | | | | | | C, 75.74 | 75.60 |
| | | | | | | | | | | H, 10.42 | 10.56 |
| Do | H | H | tert-Butyl | 1 | 2 | 299.4 | 358.0, 353.5 | $n_D^{29}$ 1.4930 | | C, 76.21 | 75.58, 75.38 |
| | | | | | | | | | | H, 10.60 | 10.44, 10.77 |
| | | | | | | | | | | P, 5.17 | 5.06, 4.95 |

The general experimental write-up below shows the procedure used in the preparation of technical mixtures of dialkyl monoaryl phosphites with monoalkyl diaryl phosphites, along with the previously mentioned small amounts of triaryl or trialkyl phosphites.

The appropriate mixture of mono and diaryl phosphorochloridite, alone or dissolved in an inert solvent, was added dropwise, with stirring, to at least a chemically equivalent amount of the appropriate alcohol. The alcohol was diluted with an inert solvent, or excess alcohol was used as its own solvent. A sufficient amount of methyl red indicator was present to denote change from basicity to acidity. Reaction temperature varied from about 5° C. to about 20° C. Simultaneously with the addition of the phosphorochloridite mixture, dry ammonia gas was bubbled into the reaction mixture in an amount sufficient to maintain the reaction mixture just basic to methyl red.

Upon completing the addition, stirring was continued for a short period. Total reaction time varied from about 15 minutes to about 70 minutes.

The ammonium chloride was removed by filtration or by washing with the calculated amount of 3.5% NaOH solution and 10% NaOH solution. The filtrate was clarified by treatment with activated charcoal.

The oil residue was freed of inert solvent or excess alcohol by reduced pressure distillation at a pot temperature of 90–95° C. and at 20–60 mm. pressure, leaving the product as a residue.

Our invention is illustrated with respect to both the broad process and the relatively limited groups of useful mixtures by the following examples:

A. PHOSPHITE MIXTURES PREPARED FROM THE REACTION PRODUCT OF 2 MOLES OF PHENOL AND 1 MOLE OF PCl₃

*Example XXIII*

TECHNICAL MIXTURE OF 2-ETHYLHEXYL BIS(p-OCTYLPHENYL) PHOSPHITE AND BIS(2-ETHYLHEXYL) p-OCTYLPHENYL PHOSPHITE FROM 2:1 MIXTURE OF THE PHENOL AND PCl₃

A solution of 47.7 g. of the mixture of phosphorochloridites prepared in Example VI in 100 ml. of hexane was added dropwise to a stirred solution of 15.0 g. of 2-ethylhexanol and 0.1 g. of methyl red indicator in 100 ml. of hexane at a sufficient rate to maintain a temperature of from 10° to 15° C. while cooling with an ice bath. Simultaneously, dry ammonia gas was bubbled into the reaction mixture at a sufficient rate to keep the solution just basic to methyl red. Twenty-five minutes was required for this addition. The reaction mixture was stirred for an additional 10 minutes, and the temperature was allowed to increase to about 20° C. The mixture was filtered to remove ammonium chloride, and the filtrate was decolorized by treatment with activated charcoal. Finally, the hexane was removed by distillation to a pot temperature of 90° C. at 20 mm. The resulting product weighed 54.3 g.

*Anal.*—Equivalent weight (iodometry): Found—420, 421.

*Example XXIV*

TECHNICAL MIXTURE OF ALLYL BIS(p-OCTYLPHENYL) PHOSPHITE AND DIALLYL p-OCTYLPHENYL PHOSPHITE FROM 2:1 MIXTURE OF THE PHENOL AND PCl₃

A solution of 47.7 g. of the mixture of p-octylphenyl phosphorochloridites from Example VI, which contained 2.47 milliequivalents of reactive chlorine per gram, was made up in 75 ml. of hexane. This was added dropwise to a stirred solution of 6.9 grams of allyl alcohol and 0.1 g. of methyl red indicator in 75 ml. of hexane at a rate sufficient to maintain a temperature of from 10° to 15° C. while cooling with an ice-salt bath. Simultaneously, dry ammonia gas was bubbled into the reaction mixture at a rate sufficient to keep the solution just basic to methyl red. A period of 27 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with activated charcoal. The hexane was removed from the product by distillation to a pot temperature of 95° C. at 50 mm. to give 49.9 g. of product; $n_D^{27°}$ C. 1.5152, $d_4^{20}$ 0.997.

*Anal.*—Equivalent weight (iodometry): Found—372, 365.

*Example XXV*

TECHNICAL MIXTURE OF 2-ETHYLHEXYL DI-MIXED m (AND p)-TOLYL PHOSPHITE AND BIS (2-ETHYLHEXYL) MIXED m (AND p)-TOLYL PHOSPHITE FROM 2:1 MIXTURE OF THE PHENOL AND PCl₃

A solution of 28 g. of the mixture of phosphorochloridites prepared in Example VIII in 75 ml. of hexane was added dropwise to a stirred solution of 13 g. of 2-ethylhexanol and 0.1 g. of methyl red indicator in 75 ml. of hexane at a sufficient rate to maintain a temperature of from 10° to 15° C. while cooling with an ice-salt bath. Simultaneously, dry ammonia gas was bubbled into the reaction mixture at a sufficient rate to keep it just basic to methyl red. A period of 28 minutes was required for this addition. The reaction mixture was stirred for an additional 10 minutes, and the temperature was allowed to increase to about 20° C. The ammonium chloride was removed from the reaction mixture by filtration, and this filtrate was then clarified by treatment with activated charcoal. The hexane was removed by distillation to a pot temperature of 90° C. at 20 mm. The yield of undistilled product amounted to 37.1 g.

*Anal.*—Equivalent weight (iodometry). Found—256, 260.

Example XXVI

TECHNICAL MIXTURE OF ISOOCTYL MIXED DI-m (AND p)-TOLYL PHOSPHITE AND DIISOOCTYL MIXED m (AND p)-TOLYL PHOSPHITE FROM 2:1 MIXTURE OF THE PHENOL AND PCl₃

Forty grams of a mixture of m (and p)-tolyl phosphorochloridites similar to that prepared in Example VIII, and containing 3.66 milliequivalents of reactive chlorine per gram, was dissolved in 65 ml. of hexane. This solution was added to a stirred solution of 19.05 g. of isooctyl alcohol and 0.1 g. of methyl red indicator in 65 ml. of hexane at a rate sufficient to keep the temperature at from 5° to 10° C. while cooling with an ice-salt bath. Simultaneously, dry ammonia gas was bubbled into the reaction mixture at a rate sufficient to keep it just basic to methyl red. A period of 15 minutes was required for this addition.

To the vigorously stirred reaction mixture was added 36.7 ml. of 3.5% sodium hydroxide solution, and stirring was continued for 5 minutes. The water and oil layers were separated, and the oil layer was washed a second time in a manner similar to the above with 7.3 ml. of 10% sodium hydroxide solution. The oil layer was then freed of hexane by distillation to a pot temperature of 95° C. at 20 mm. The resulting residue was vacuum distilled to give 41.1 g. of product, B.P. 157–165° C./0.07 mm.

*Anal.*—Equivalent weight (iodometry): Found—194.

Example XXVII

TECHNICAL MIXTURE OF OLEYL DI-MIXED m (AND p)-TOLYL PHOSPHITE AND DIOLEYL MIXED m (AND p)-TOLYL PHOSPHITE FROM 2:1 MIXTURE OF THE PHENOL AND PCl₃

A solution of 28.0 g. of the mixture of m (and p)-tolyl phosphorochloridites prepared in Example VIII in 75 ml. of hexane was added dropwise to a stirred solution of 26.9 g. of oleyl alcohol and 0.1 g. of methyl red indicator in 75 ml. of hexane at a rate sufficient to maintain a temperature of 10° C.±2° C. while cooling with an ice-salt bath. Simultaneously, dry ammonia gas was bubbled into the reaction mixture at a rate sufficient to keep the solution just basic to methyl red. A period of 27 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with charcoal. The hexane was removed from this product by distillation to a pot temperature of 90° C. at 60 mm. to give 45.4 g. of product, $n_D^{27° C.}$ 1.5050, $d_4^{20}$ 0.970.

*Anal.*—Equivalent weight (iodometry): Found—348, 355.

Example XXVIII

TECHNICAL MIXTURE OF 2-ETHYLHEXYL DIPHENYL PHOSPHITE AND BIS(2-ETHYLHEXYL) PHENYL PHOSPHITE FROM 2:1 MIXTURE OF THE PHENOL AND PCl₃

A solution of 252.6 g. of the mixture of phenyl phosphorochloridites prepared in Example X in 500 ml. of hexane was added dropwise to a stirred solution of 110.0 g. of 2-ethylhexanol and 0.1 g. of methyl red in 500 ml. of hexane at a rate sufficient to maintain a temperature of from 5° to 10° C. while cooling with an ice-salt bath. Simultaneously, dry ammonia gas was bubbled into the reaction mixture at a sufficient rate to keep the solution just basic to methyl red. A period of 45 minutes was required for this addition. The reaction mixture was stirred for an additional 10 minutes, and the temperature was allowed to increase to about 20° C. The ammonium chloride was removed from the reaction mixture by filtration, and the filtrate was clarified by treatment with activated charcoal. The hexane was removed by distillation to a pot temperature of 95° C. at 50 mm. to give 301 g. of technical product: $n_D^{26° C.}$ 1.5247, $d_4^{20}$ 1.058.

*Anal.*—Equivalent weight (iodometry): Found—222.

Example XXIX

TECHNICAL MIXTURE OF OLEYL DIPHENYL PHOSPHITE AND DIOLEYL PHENYL PHOSPHITE FROM 2:1 MIXTURE OF THE PHENOL AND PCl₃

A solution of 25.3 g. of the mixture of phenyl phosphorochloridites prepared in Example X in 75 ml. of hexane was added dropwise to a stirred solution of 33.1 g. of oleyl alcohol and 0.1 g. of methyl red indicator in 75 ml. of hexane at a rate sufficient to maintain a temperature of 10° C.±2° C. while cooling with an ice-salt bath. Simultaneously, dry ammonia gas was bubbled into the reaction mixture at a rate sufficient to keep the solution just basic to methyl red. A period of 26 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with activated charcoal. The hexane was removed from this product by distillation to a pot temperature of 95° C. at 40 mm. to give 47.0 grams of product, $n_D^{27° C.}$ 1.4988, $d_4^{20}$ 0.960.

*Anal.*—Equivalent weight (iodometry): Found—388, 382.

B. PHOSPHITE MIXTURES PREPARED FROM THE REACTION PRODUCT OF 1 MOLE OF PHENOL AND 1 MOLE OF PCl₃

Example XXX

TECHNICAL MIXTURE OF BIS(2-ETHYLHEXYL) p-OCTYLPHENYL PHOSPHITE AND 2-ETHYLHEXYL BIS(p-OCTYLPHENYL) PHOSPHITE FROM 1:1 MIXTURE OF THE PHENOL AND PCl₃

A solution of 47.7 g. of a mixture of undistilled p-octylphenyl phosphorochloridites prepared as described in Example VII, which contained 4.59 milliequivalents of reactive chlorine per gram, was made up in 75 ml. of hexane. This was added dropwise to a stirred solution of 28.5 g. of 2-ethylhexanol and 0.1 g. of methyl red indicator in 75 ml. of hexane at a sufficient rate to maintain the temperature at 15° C. while cooling with an ice-salt bath. Simultaneously, dry ammonia gas was bubbled into the reaction mixture at a sufficient rate to hold the reaction mixture just basic to methyl red. A period of 28 minutes was required for this addition. The reaction mixture was stirred for an additional 10 minutes, and the temperature was allowed to increase to about 20° C. The ammonium chloride was removed by filtration, and the filtrate was decolorized by treatment with activated charcoal. The hexane was removed by distillation to a pot temperature of 90° C. at 20 mm. The final undistilled product weighed 54 g.

*Anal.*—Equivalent weight (iodometry): Found—356.5, 350.5.

Example XXXI

TECHNICAL MIXTURE OF DIOLEYL p-OCTYLPHENYL PHOSPHITE AND OLEYL BIS(p-OCTYLPHENYL) PHOSPHITE FROM 1:1 MIXTURE OF THE PHENOL AND PCl₃

A solution of 23.8 g. of the mixture of p-octylphenyl phosphorochloridites from Example VII, which contained 4.59 milliequivalents of reactive chlorine per gram, was made up in 75 ml. of hexane. This was added dropwise to a stirred solution of 29.4 g. of oleyl alcohol and 0.1 g. of methyl red indicator in 75 ml. of hexane at a rate sufficient to maintain a temperature of 10±2° C. while cooling with an ice-salt bath. Simultaneously, dry ammonia gas was bubbled into the reaction mixture at a rate sufficient to keep the solution just basic to methyl red. A period of 24 minutes was required for this addition. The reaction mixture was stirred for an additional 15 minutes, and the temperature allowed to increase to about 20° C. The ammonium chloride was removed from the reaction mixture by filtration, and the filtrate was clarified by treatment with activated charcoal. The hexane was removed from the product by distillation to a pot temperature of 95° C. at 6° mm. to give 50.9 g. of product: $n_D^{27°\ C.}$ 1.4830, $d_4^{20}$ 0.917.

*Anal.*—Equivalent weight (iodometry): Found—356, 361.

Example XXXII

TECHNICAL MIXTURE OF BIS(2-ETHYLHEXYL) MIXED m (AND p)-TOLYL PHOSPHITE AND 2-ETHYLHEXYL DI-MIXED m (AND p)-TOLYL PHOSPHITE FROM 1:1 MIXTURE OF THE PHENOL AND PCl₃

A solution of 42 g. of the mixture of m (and p)-tolyl phosphorochloridites prepared in Example IX in 75 ml. of hexane was added dropwise to a stirred solution of 39.8 g. of 2-ethylhexanol and 0.1 g. of methyl red indicator in 75 ml. of hexane at a sufficient rate to maintain a temperature of from 10° to 15° C. while cooling with an ice-salt bath. Simultaneously, dry ammonia gas was bubbled into the reaction mixture at a sufficient rate to keep it just basic to methyl red. A period of 42 minutes was required for the addition. The reaction mixture was stirred for an additional 10 minutes, and the temperature was allowed to increase to about 20° C. The ammonium chloride was removed by filtration. The filtrate was clarified by treatment with activated charcoal, and then freed of hexane by distillation to a pot temperature of 90° C. at 20 mm. The resulting undistilled product weighed 61.6 g.

*Anal.*—Equivalent weight (iodometry): Found—276.5, 277.0.

Example XXXIII

TECHNICAL MIXTURE OF DIOLEYL MIXED m (AND p)-TOLYL PHOSPHITE AND OLEYL DI-MIXED m (AND p)-TOLYL PHOSPHITE FROM 1:1 MIXTURE OF THE PHENOL AND PCl₃

A solution of 28 g. of the mixture of m (and p)-tolyl phosphorochloridites prepared in Example IX in 75 ml. of hexane was added dropwise to a stirred solution of 54.6 g. of oleyl alcohol and 0.1 g. of methyl red indicator in 75 ml. of hexane at a rate sufficient to maintain a temperature of 10° C.±2° C. while cooling with an ice-salt bath. Simultaneously, dry ammonia gas was bubbled into the reaction mixture at a rate sufficient to keep the solution just basic to methyl red. A period of 26 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with activated charcoal. The hexane was removed from this product by distillation to a pot temperature of 90° C. at 60 mm. to give 65.5 g. of product: $n_D^{27.5°\ C.}$ 1.4823, $d_4^{20}$ 0.923.

*Anal.*—Equivalent weight (iodometry): Found—469, 439.

Example XXXIV

TECHNICAL MIXTURE OF BIS(2-ETHYLHEXYL) PHENYL PHOSPHITE AND 2-ETHYLHEXYL DIPHENYL PHOSPHITE FROM 1:1 MIXTURE OF THE PHENOL AND PCl₃

A solution of 195 g. of the mixture of phenyl phosphorochloridites prepared in Example XI in 500 ml. of hexane was added dropwise to a stirred solution of 174.2 g. of 2-ethylhexanol and 0.1 g. of methyl red indicator in 500 ml. of hexane at a rate sufficient to keep the temperature at from 10° to 15° C. while cooling with an ice-salt bath. Simultaneously, dry ammonia gas was bubbled into the reaction mixture at a rate sufficient to maintain it just basic to methyl red. A period of 60 minutes was required for this addition. The reaction mixture was stirred for an additional 10 minutes, and the temperature was allowed to increase to about 20° C. The ammonium chloride was removed by filtration, and the filtrate was clarified by treatment with activated charcoal. The hexane was removed by distillation to a pot temperature of 95° C. at 50 mm. The final undistilled product weighed 278 g.; its physical constants were: $n_D^{26°\ C.}$ 1.4933 and $d_4^{20}$ 0.991.

*Anal.*—Equivalent weight (iodometry): Found—224.5, 220.5.

Example XXXV

TECHNICAL MIXTURE OF DIOLEYL PHENYL PHOSPHITE AND OLEYL DIPHENYL PHOSPHITE FROM 1:1 MIXTURE OF THE PHENOL AND PCl₃

A solution of 25.3 g. of the mixture of phenyl phosphorochloridites prepared in Example XI in 75 ml. of hexane was added dropwise to a stirred solution of 44.6 g. of oleyl alcohol and 0.1 g. of methyl red indicator in 75 ml. of hexane at a rate sufficient to maintain a temperature of 10° C.±5° C. while cooling with an ice-salt bath. Simultaneously, dry ammonia gas was bubbled into the reaction mixture at a sufficient rate to keep the solution just basic to methyl red. A period of 24 minutes was required for this addition. The reaction mixture was stirred for an additional 15 minutes, and the temperature was allowed to increase to about 20° C. The ammonium chloride was removed from the reaction mixture by filtration, and the filtrate was clarified by treatment with activated charcoal. The hexane was removed from this product by distillation to a pot temperature of 95° C. at 45 mm. to give 53.7 g. of product, $n_D^{25°\ C.}$ 1.4882, $d_4^{20}$ 0.943.

*Anal.*—Equivalent weight (iodometry): Found—386, 391.

As appears from the foregoing disclosure, the process of this invention is applicable generally for the production of aliphatic aryl triesters of phosphorous acid by the reaction of an aryl phosphorohalidite with various alcohols including mono-, di- and polyhydroxy alcohols, primary and secondary alcohols in which the hydrocarbon group is straight chain or branched, saturated and unsaturated alcohols and alcohols in which hydrogen of the hydrocarbon group is unsubstituted or substituted by inactive substituents such as halogen. No limit has been found and none appears probable as to the size of the aliphatic group R at least up to those having about 18 carbon atoms.

As also appears from the foregoing closure, the process of this invention is applicable for the production of aliphatic aryl triesters of phosphorous acid which contain a wide variety of aryl groups. By starting with the proper aryl phosphorohalidite, triesters can be made which contain either one aryl group or two aryl groups which may or may not be identical. No limit has been found and none appears probable as to the chain length of alkyl substituent $R_3$ on the aryl nucleus at least up to aryl groups containing substituents having 20 carbon atoms.

While the use of inert solvent or excess of the alcohol or both is not essential, such use is an important feature of the process from the standpoint of economical production of the triesters.

The temperature at which the reaction is carried out, like the use of solvent, also is not the essence of the invention, but is important particularly when correlated with the use of solvent, the degree of agitation, the type of aryl phosphorohalidite employed and the size of the aliphatic group in determining the optimum conditions for operation of the process.

While the description has dealt more particularly with the addition of an aryl phosphorochloridite to a body of the alcohol in the presence or absence of inert solvent and with simultaneous addition of anhydrous ammonia at such a rate as to maintain the reaction mixture substantially neutral, the reaction may be carried out by a simultaneous addition of an aryl phosphorohalidite and an alcohol to a reaction space which may at the start be empty or may contain some of the alcohol and/or inert solvent provided that anhydrous ammonia also is added at such a rate as to maintain the reaction mixture substantially neutral and provided further than an excess of the aryl phosphorohalidite in the reaction mixture is avoided.

This application is a division of our application Serial No. 579,777 filed April 23, 1956, now abandoned, which application is in turn a continuation-in-part of our application Serial No. 423,536 filed April 15, 1954, now U.S. Patent No. 2,866,807, granted December 30, 1958.

We claim:

1. As a new composition of matter, a mixture of GRS rubber and a compound of the formula

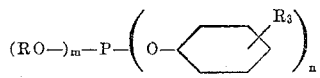

in which R is a member selected from the group consisting of octyl, allyl, oleyl and 3-cyclohexen-1-ylmethyl, $R_3$ is an alkyl having from 1 to 9 carbon atoms and $m$ and $n$ are integers the sum of which is 3, said compound being present in an amount sufficient to stabilize said rubber.

2. As a new composition of matter, a mixture of GRS rubber and octyl bis(octylphenyl) phosphite, said phosphite being present in an amount sufficient to stabilize said rubber.

3. As a new composition of matter, a mixture of GRS rubber and 2-ethylhexyl bis(p-octylphenyl) phosphite, said phosphite being present in an amount sufficient to stabilize said rubber.

4. As a new composition of matter, a mixture of GRS rubber and bis(octyl)mono-(octylphenyl) phosphite, said phosphite being present in an amount sufficient to stabilize said rubber.

5. As a new composition of matter, a mixture of GRS rubber and bis(2-ethylhexyl)mono-(octylphenyl) phosphite, said phosphite being present in an amount sufficient to stabilize said rubber.

6. As a new composition of matter, a mixture of GRS rubber and bis(2-ethylhexyl)p-(1,1,3,3-tetramethylbutyl)-phenyl phosphite, said phosphite being present in an amount sufficient to stabilize said rubber.

7. As a new composition of matter, a mixture of GRS rubber and allyl bis(nonylphenyl) phosphite, said phosphite being present in an amount sufficient to stabilize said rubber.

8. As a new composition of matter, a mixture of GRS rubber and bis(2-ethylhexyl)tolyl phosphite, said phosphite being present in an amount sufficient to stabilize said rubber.

9. As a new composition of matter, a mixture of GRS rubber and allyl ditolyl phosphite, said phosphite being present in an amount sufficient to stabilize said rubber.

References Cited in the file of this patent

UNITED STATES PATENTS

| | | |
|---|---|---|
| 2,739,952 | Linville | Mar. 27, 1956 |
| 2,877,259 | Bill | Mar. 10, 1959 |

FOREIGN PATENTS

| | | |
|---|---|---|
| 450,283 | Canada | Aug. 3, 1948 |